United States Patent
Crum

(10) Patent No.: US 12,533,865 B1
(45) Date of Patent: Jan. 27, 2026

(54) DUPLEX LINERS AND METHODS OF MAKING AND USING SAME

(71) Applicant: Rekon, LLC, Pittsburg, KS (US)

(72) Inventor: Jesse D. Crum, Fort Scott, KS (US)

(73) Assignee: Rekon, LLC, Pittsburg, KS (US)

( * ) Notice: Subject to any disclaimer, the term of this patent is extended or adjusted under 35 U.S.C. 154(b) by 0 days.

(21) Appl. No.: 18/325,212

(22) Filed: May 30, 2023

Related U.S. Application Data

(63) Continuation of application No. 17/141,158, filed on Jan. 4, 2021, now Pat. No. 11,660,833, which is a continuation of application No. 15/914,647, filed on Mar. 7, 2018, now Pat. No. 10,882,269.

(60) Provisional application No. 62/467,890, filed on Mar. 7, 2017.

(51) Int. Cl.
*B31D 1/02* (2006.01)

(52) U.S. Cl.
CPC ............. *B31D 1/021* (2013.01); *B31D 1/027* (2013.01)

(58) Field of Classification Search
CPC ................................. B31D 1/021; B31D 1/027
See application file for complete search history.

(56) References Cited

U.S. PATENT DOCUMENTS

| | | | |
|---|---|---|---|
| 4,837,088 A | 6/1989 | Freedman | |
| 4,925,714 A | 5/1990 | Freedman | |
| 5,330,812 A * | 7/1994 | Knoerzer | A61F 13/0259 |
| | | | 428/476.3 |
| 5,512,343 A * | 4/1996 | Shaw | G09F 3/10 |
| | | | 283/81 |
| 5,676,785 A | 10/1997 | Samonides | |
| 6,179,337 B1 * | 1/2001 | Zumberge | B42D 25/20 |
| | | | 283/79 |
| 6,210,767 B1 * | 4/2001 | Knauf | C09J 7/405 |
| | | | 428/41.5 |
| 10,882,269 B1 | 1/2021 | Crum | |
| 11,660,833 B1 | 5/2023 | Crum | |
| 2001/0052386 A1 | 12/2001 | Treleaven et al. | |
| 2011/0146912 A1 * | 6/2011 | Howarth | B65C 9/46 |
| | | | 40/675 |
| 2014/0274632 A1 | 9/2014 | Tilton | |

OTHER PUBLICATIONS

Midgley et al., "Styrene-Butadiene Rubber Adhesives", Handbook of Adhesives, Chapter 12, pp. 227-238, Skeist ed. Van Nostrand Reinhold, 1990. (Year: 1990).*

* cited by examiner

*Primary Examiner* — Christopher W Raimund
(74) *Attorney, Agent, or Firm* — AVEK IP, LLC

(57) ABSTRACT

A liner for a label. The liner has a plastic ply and a paper ply. The plastic ply is fused to the paper ply with a binder. Indicia printed on the paper ply is visible through said plastic ply. The plastic ply includes a release material and a face ply of the label includes adhesive. The label includes a face ply. The plastic ply is releasably secured to the face ply.

15 Claims, 4 Drawing Sheets

DUPLEX LINERS AND METHODS OF MAKING AND USING SAME

CROSS REFERENCE TO RELATED APPLICATIONS

This application is a continuation of U.S. patent application Ser. No. 17/141,158, filed Jan. 4, 2021, to issue as U.S. Pat. No. 11,660,833, which is a continuation of U.S. patent application Ser. No. 15/914,647, filed Mar. 7, 2018, now U.S. Pat. No. 10,882,269, which claims priority to U.S. Provisional Patent Application No. 62/467,890, filed Mar. 7, 2017, the disclosures of each of which is incorporated by reference in its entirety herein.

FIELD OF THE DISCLOSURE

The disclosure relates generally to the field of liners used in the label industry. More specifically, the disclosure relates to a strong printable duplex liner for use with printable labels and a method of making and using the duplex liner.

BACKGROUND

A prior art label has a printable ply, referred to by the artisan as face stock, and a liner. The face stock has adhesive on its back face and the adhesive is protected by a liner that is flimsy, weak, and cheap and easy to make. Such conventional liners suffice to cover the adhesive on the face stock prior to use of the label, particularly where the labels are applied by hand. In large warehouses or high-volume shipping companies, however, where automated labeling systems are used to label the packages for storage or shipment, the conventional liners cause problems. For example, the traditional liners may tear or bind up in the automated labeling systems due to their flimsy nature, causing down time and costly production delays.

SUMMARY

In some aspects, the techniques described herein relate to a label, including: a face ply including a face ply upper side and a face ply lower side, said face ply upper side configured to be printable, said face ply lower side including an adhesive; a liner, said liner including an upper liner ply and a lower liner ply, said upper liner ply including plastic having a release liner disposed thereon, said lower liner ply including printable paper, said upper liner ply being fused to said lower liner ply; wherein, said upper liner ply is releasably secured to said face ply lower side.

In some aspects, the techniques described herein relate to a label, wherein said upper liner ply is fused to said lower liner ply with a binder.

In some aspects, the techniques described herein relate to a label, wherein said binder includes synthetic latex.

In some aspects, the techniques described herein relate to a label, wherein said binder includes a copolymerized emulsion.

In some aspects, the techniques described herein relate to a label, wherein said copolymerized emulsion includes Styrene and Butadiene.

In some aspects, the techniques described herein relate to a label, wherein said upper liner ply is transparent.

In some aspects, the techniques described herein relate to a label, wherein said lower liner ply has a first side and a second side, said first side facing said upper liner ply and said second side facing away from said upper liner ply.

In some aspects, the techniques described herein relate to a label, wherein said first side is configured to be printable.

In some aspects, the techniques described herein relate to a label, wherein indicia printed on said first side is viewable through said upper liner ply.

In some aspects, the techniques described herein relate to a label, wherein said upper liner ply includes release material.

In some aspects, the techniques described herein relate to a label including a printable face ply and a liner, said liner including at least two plies, one of said at least two plies including plastic, another of said at least two plies including printable paper, wherein said plastic ply and said paper ply are fused to each other and said plastic ply is releasably secured to said printable face ply.

In some aspects, the techniques described herein relate to a label, wherein indicia printed on said paper ply is visible through said plastic ply.

In some aspects, the techniques described herein relate to a label, wherein said plastic ply and said paper ply are fused to each other via a bonding agent.

In some aspects, the techniques described herein relate to a label, wherein said paper ply has a direct thermal printable coating.

In some aspects, the techniques described herein relate to a label, wherein an upper surface of said paper ply is configured to be printable.

In some aspects, the techniques described herein relate to a liner for a label including: an upper ply including transparent plastic; a lower ply including paper; wherein: said upper ply is secured to said lower ply; and indicia printed on said lower ply is visible through said upper ply.

In some aspects, the techniques described herein relate to a liner, wherein said upper ply is releasably secured to a printable face ply.

In some aspects, the techniques described herein relate to a liner, wherein said upper ply is permanently secured to said lower ply.

In some aspects, the techniques described herein relate to a liner, wherein said paper is configured to be printed via a direct thermal printer.

In some aspects, the techniques described herein relate to a liner, wherein said paper is configured to be printed via a laser printer.

BRIEF DESCRIPTION OF THE SEVERAL VIEWS OF THE DRAWINGS

Illustrative embodiments of the present disclosure are described in detail below with reference to the attached drawing figures and wherein.

DETAILED DESCRIPTION

Labels, such as shipping labels, pharmaceutical labels, food labels, etc., are ubiquitous. A typical label includes a printable sheet (also referred to as face stock) and a liner. The printable sheet has adhesive disposed on one side thereof. The liner has silicone disposed on one of its sides. The label is formed by releasably adhering the face stock to the liner such that the adhesive on the printable sheet contacts the silicone on the liner. The silicone allows the liner to be removed from the face stock when the label is ready for use.

The face stock of conventional labels may be configured to have a plurality of attributes. For example, and depending on the application, the face stock may be configured to resist peeling off the object to which it is adhered, to resist exposure from heat, to resist exposure from light, to receive machine readable indicia or other indicia, etc. The liner of conventional labels, conversely, is typically configured to perform a solitary task—to cover the adhesive on the associated printable sheet so that the printable sheet may be secured to an object once the liner is removed therefrom. Often, the primary consideration for the manufacture of such disposable liners is cost. Because liners conventionally serve only one purpose, the emphasis is on effectuating this function as cheaply as possible and on nothing more. To this end, the liners of conventional labels are flimsy and made of inexpensive material.

In some applications, it may be desirable to have a liner that is stronger than a traditional liner used in the label industry. It may also be desirable in some applications to have a printable liner. For example, a strong, resilient liner may be advantageous for auto-apply applications (as the traditional liners may tear or bind up in the automated labeling systems due to their flimsy nature). It may likewise be desirable in some applications for the liner to be printable, so that information (e.g., a listing of contents of the package to which the label is adhered, a coupon, a special offer, etc.) may be conveyed to the user. But, the cost of such a strong, printable liner suitable for use in automated labeling systems, if manufactured using conventional processes, may be prohibitive, and indeed, may exceed the cost of the face stock. Such may be undesirable. It may therefore be advantageous to create a liner that is stronger than a conventional liner and is more versatile (e.g., is printable), but which does not add considerably to the cost of making the label as a whole. The present disclosure may, among other things, provide a liner that achieves these and/or other objectives.

Figure 1:
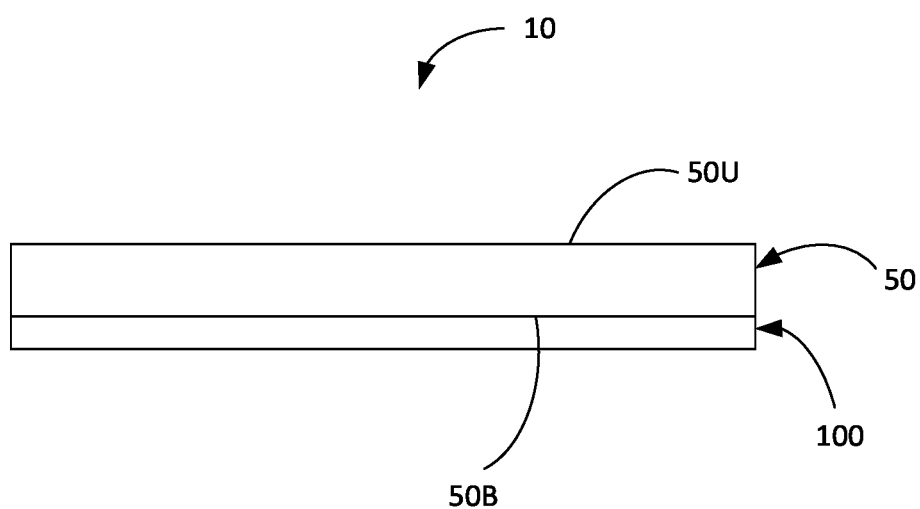
FIG. 1 is a side view of a label having a liner according to an embodiment of the present disclosure.

FIG. 1 shows a label 10 having a liner 100 made in accordance with an embodiment of the present disclosure. The label 10 may be a shipping label, or another type of label. The label 10 may have a face stock 50 having an upper surface 50U and a bottom surface 50B. The upper surface 50U may be configured to receive indicia (e.g., may be printable) and the bottom surface 50B may be provided with adhesive to allow the liner 100 to be releasaby coupled thereto, as discussed herein. In embodiments, the face stock 50 may comprise a solitary ply, whereas in other embodiments, the face stock 50 may comprise two or more plies, at least one of which may be configured to receive indicia (e.g., machine readable indicia, printed indicia, handwritten indicia, etc.). As discussed herein, the liner 100 may comprise at least two plies that are fused together. The two plies may allow the liner 100 to be more resilient as compared to traditional liners, and further, may advantageously allow the liner 100 to receive printed or other indicia.

Figure 2:
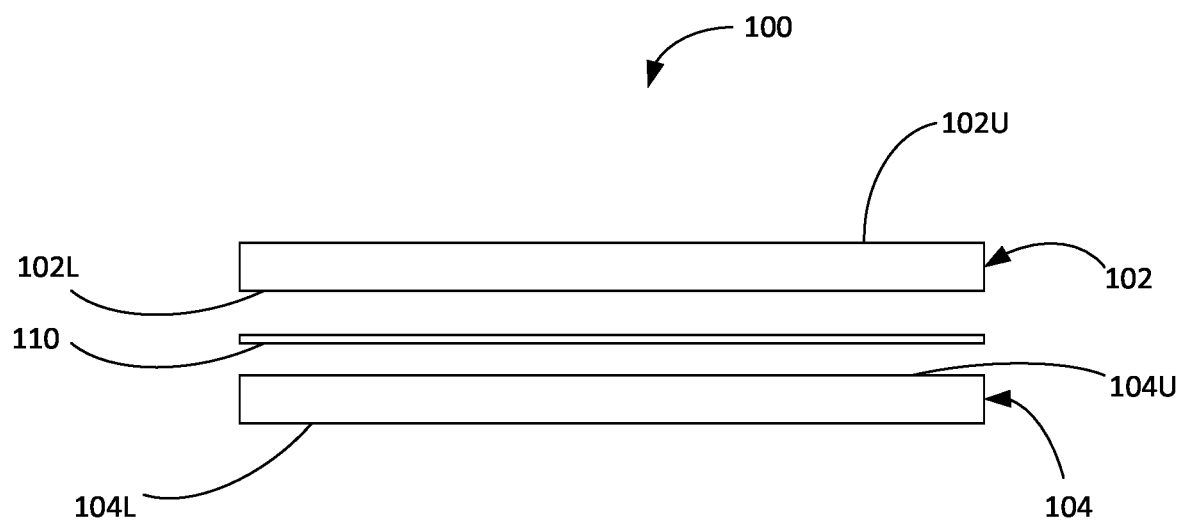
FIG. 2 is an exploded view of the liner of FIG. 1.

FIG. 2 shows an exploded view of the liner 100 of FIG. 1. The liner 100 may also be referred to herein as a "duplex liner." As noted, however, in embodiments, the liner 100 may have more than two plies.

The illustrated liner 100 comprises a first (or a top) ply 102 and a second (or a bottom) ply 104. The first ply 102 has an upper surface 102U and a lower surface 102L. The second ply 104 likewise has an upper surface 104U and a lower surface 104L.

In an embodiment, the first ply 102 may be or may comprise a polyester (or other plastic) sheet. Alternately, the first ply 102 may comprise a sheet made of another suitable material (e.g., another polymer) that allows the first ply 102 to be more resilient as compared to the second ply 104. That is, the first ply 102 may, in embodiments, be relatively rigid as compared to the second ply 104 (and traditional liners). The polyester sheet 102 may, in embodiments, be transparent or generally transparent.

The first ply 102, on its upper surface 102U, may be provided with a release material, such as silicone and/or another release material (e.g., a nonstick coating). The upper surface 102U may thereafter be placed in contact with the bottom surface 50B of the face stock 50, and more particularly, with the adhesive situated thereon. Such may cause the first ply 102 of the liner 100 (together with the second ply 104 thereof, as discussed herein) to releasably adhere to the bottom side 50B of the face stock 50 to form the label 10.

The second ply 104 of the liner 100 may comprise paper and/or typical release liner material. The second ply 104 may in embodiments be opaque or generally opaque, and in other embodiments, may be translucent. In embodiments, the second ply 104 may be configured to be printable (e.g., may be configured to receive printed and/or handwritten indicia). For example, the second ply 104 may be configured to be printed with a direct thermal printer, a thermal printer, a laser printer, or another printer. The artisan will understand that the material for the second ply 104 (and the other parts forming the duplex liner 100) may be chosen in line with the requirements of a particular application. For instance, if the application would benefit from a printable liner that is durable, a relatively higher quality printable second ply 104 may be employed in the liner 100.

The first ply 102 and the second ply 104 may, in an embodiment, be fused together with a binder (or bonding agent) 110. The fusing of the first ply 102 and the second ply 104 via the binder 110 may increase the resilience of the liner 100 as compared to typical prior art liners. Moreover, because the second ply 104 may be printable and the liner 100 may be relatively resilient at least in part in part because of the first ply 102 thereof, the liner 100 may be more versatile than prior art liners.

The binder 110 may, in embodiments, comprise synthetic latex. For example, the binder 110 may be a copolymerized emulsion, such as an emulsion comprising Styrene, Butadiene, and Acrylic monomer. In an embodiment, the binder 110 may be commercially available, and may include, e.g., HITEX S-209 or another binder. In another embodiment, a different binder (e.g., a suitable adhesive) may be used to fuse the first ply 102 and the second ply 104. In some embodiments, and as discussed herein, indicia may be printed on the lower surface 104L of the second ply 104. Alternately or additionally, in embodiments, the upper surface 104U of the second ply 104 may be configured to be printable. Where the upper surface 104U of the second ply 104 is printable, care may be taken to ensure that the binder 110 is chosen such that it does not adversely interact with the printable coating (e.g., the direct thermal coating) or the printed indicia on the upper surface 104U of the second ply 104.

Figure 3:
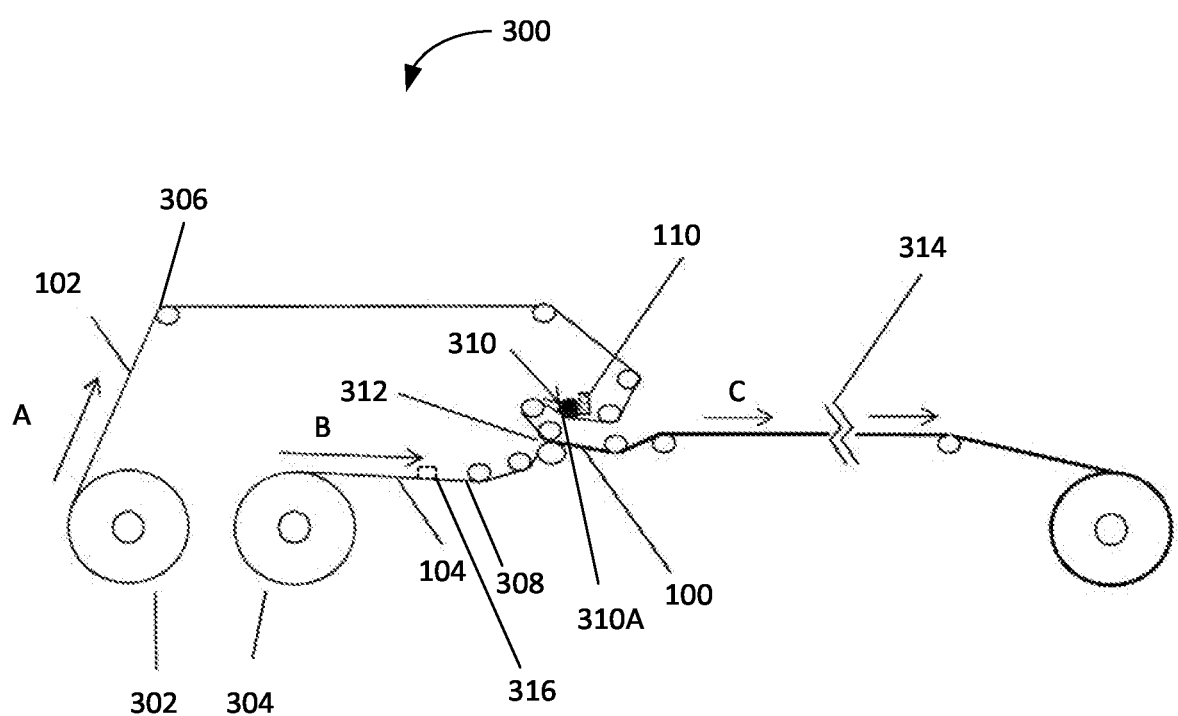
FIG. 3 is a schematic representation of a system for making the liner of FIG. 1, in an embodiment.

FIG. 3 schematically represents a system 300 for making the liner 100, in an embodiment. The artisan will understand that the system 300 and the various components thereof as described herein are merely exemplary and that the figure is not intended to be independently limiting. The system 300 may also be referred to herein as a printing press 300.

The system 300 may, in an embodiment, comprise a first (or left) unwinding station 302 and a second (or right) unwinding station 304. One of the unwinding stations may be associated with the first ply 102 and the other unwinding station may be associated with the second ply 104. For example, the left unwinding station 302 may be associated with the first ply 102 and the right unwinding station 304 may be associated with the second ply 104. The first and the second unwinding stations 302 and 304 may respectively unwind rolls of the first ply 102 and the second ply 104 to allow the system 300 to form liners 100 therefrom, as discussed herein. The system 300 may comprise one or more rollers, e.g., roller 306 and 308 and other rollers, to allow the first ply 102 and the second ply 104 (and more specifically, a sheet comprising a plurality of first plies 102 and a sheet comprising a plurality of second plies 104) to move through the system 300 as desired to form the liners 100.

The first ply 102 (and more particularly, a sheet comprising a plurality of first plies 102) may travel along the path A and eventually come into contact with a flood coat roller 310. The flood coat roller 310 may be configured to aid in the application of the binder 110 to the first ply 102, and more specifically, to the lower surface 102L thereof. In an embodiment, the coating of the binder 110 applied to the first ply 102 may be about 10 BCM. Alternately, another suitable amount of the binder 110 may be applied to the lower surface 102L of the first ply 102. In an alternate embodiment, a different configuration of rollers may be used to facilitate the application of the binder 110 to the first ply 102 (e.g., embodiments where the first ply 102 passes between an analog roller and a flex roller that rotate in opposite directions and are driven by an impression (e.g., an anvil) roller are also contemplated).

The system 300 may comprise two complementary press rollers 312. The press rollers 312 may be configured to apply pressure to the two (or more) plies passing therethrough such that they are pressed together. Once the first ply 102 has the binder 110 applied to the lower surface 102L thereof, it may travel to the press rollers 312, where it may meet the second ply 104, and specifically, come adjacent and contact the upper surface 104U thereof. The press rollers 312 may press the first ply 102 against the second ply 104. This pressure applied by the press rollers 312, together with the tackiness of the binder 110, may cause the first ply 102 (and specifically, the lower surface 102L thereof) to fuse with the second ply 104 (and specifically, the upper surface 104U thereof).

Care may be taken to ensure that the first ply 102, once the binder 110 has been disposed on the underside 102L thereof, comes into contact with the second ply 104 so as to allow the binder 110 to fuse the first ply 102 to the second ply 104. Specifically, once the binder 110 is applied to the lower surface 102L of the first ply 102, the first ply 102 may become soggy for a time period until the binder 110 has had the opportunity to dry at least in part. Thus, if the binder 110 is applied to the lower surface 102L of the first ply 102 and then the first ply 102 is immediately brought into contact with the second ply 104 at the press roller 312, the first ply 102 may be unduly wet and therefore may not properly fuse with the second ply 104. Alternately, if an unduly long delay exists between the application of the binder 110 to the first ply and the meeting of the first ply 102 and the second ply 104 in the press rollers 312, the binder 110 may become too dry and may become unworkable to suitably fuse the first ply 102 to the second ply 104. Experimentation has shown that if the first ply 102 is running at about a 100 feet a minute along path A, the distance between a point 310A at which the binder 110 is applied to the first ply 102 and the press rollers 312 (i.e., a "wet distance") may be about 12 inches to 14 inches. Such a wet distance of about 12 inches to 14 inches (when the first ply is running at about a 100 feet a minute) may give the binder 110 time to suitably dry (and not over-dry) to allow the first ply 102 to be fused to the second ply 104. Of course, if the first ply 102 is running at about 200 feet a minute along path A, the distance between the point 310A at which the binder 110 is applied to the first ply 102 and the press rollers 312 may be doubled to between 24 inches to 28 inches. Likewise, if the first ply 102 is running at about 50 feet a minute on path A, the wet distance may be decreased to between 6 inches and 7 inches. And so on.

The duplex liner 100 (and more particularly, a sheet comprising a plurality of duplex liners 100) may then go downstream the press rollers 312 along path C for post-processing. The post-processing is schematically illustrated in FIG. 3 at point 314. The post-processing may include, e.g., die cutting the fused sheet comprising the plurality of liners 100 to create individual liners 100. The post-processing may also include printing, fan folding, adding perforations, and other such post-processing steps that may allow the liners 100 to be used as desired. For example, in an embodiment, the liner 100 may be provided with a perforated border inwardly adjacent the outer edges thereof; in these embodiments, adhesive may be provided outwardly adjacent the perforated border to allow the liner 100 to adhere to the face stock 50 and printed indicia may be provided inwardly adjacent the perforated border to allow the printed section to be separated from the remainder of the liner 100 after the liner 100 is separated from the face stock 50.

In an embodiment, and particularly where the upper surface 104U of the second ply 104 is configured to be printable, the system 300 may optionally comprise a printing station 316 along path B upstream of the press rollers 312 where the first ply 102 is fused with the bottom ply 104. The printing station 316 may be configured to print indicia on the upper surface 104U of the second ply 104. As noted, the first ply 102 may in embodiments comprise clear poly material. The clear poly material of the first ply 102 may allow the indicia printed on the upper surface 104U of the second ply 104 to be viewed therethrough after the bonding of the first ply 102 and the second ply 104, thereby adding to the versatility of the duplex liner 100. As noted, in these embodiments, care may be taken to ensure that the binder 110 does not adversely interact with the printable coating and/or the printed indicia on the upper surface 104U of the second ply 104. Alternately or additionally, a printing station may be provided downstream of the press rollers 312 and/or a user downstream of the label manufacturer (e.g., a retailer) may print indicia on the lower surface 104L of the second ply 104 prior to adhering the label 10 to an object.

Figure 4:
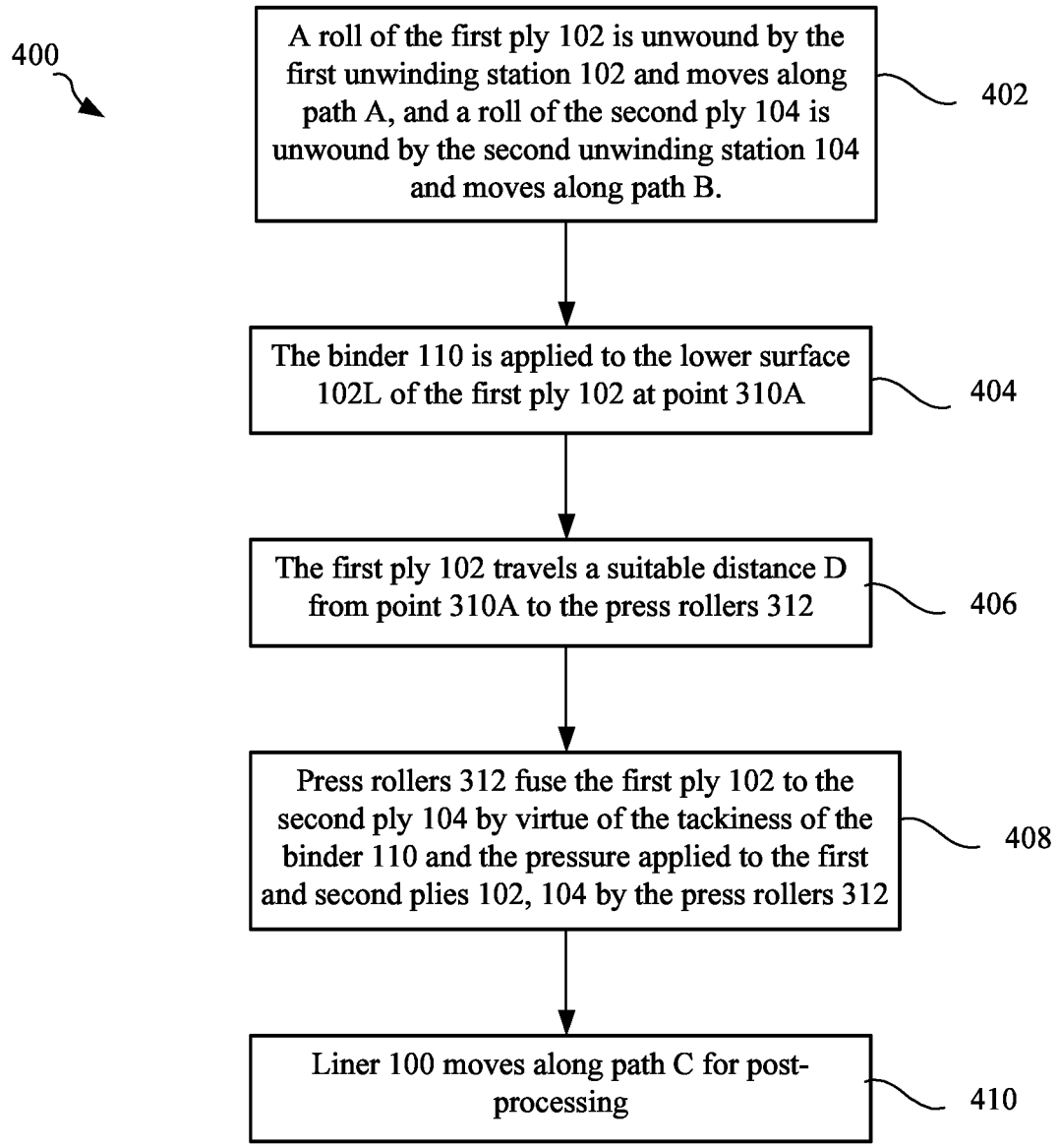
FIG. 4 is a flowchart illustrating a method for making the liner of FIG. 1 using the system of FIG. 3.

FIG. 4 shows a method 400 for making the liner 100, in an embodiment. At step 402, a roll of the first ply 102 may be unwound by the first unwinding station 302 and move along path A, and a roll of the second ply 104 may be unwound by the second unwinding station 304 and move along path B.

At step 404, and with the aid of the flood coat roller 310 (or via other means), the binder 110 may be applied to the lower surface 102L of the first ply 102 at point 310A.

At step 406, after the binder 110 is applied to the lower surface 102L of the first ply 102, the first ply 102 may travel a suitable distance D to the press rollers 312. As noted, the suitable distance D may depend on the speed at which the first ply is traveling at path A. For example, if the first ply 102 is traveling at path A at about 100 feet a minute, the distance D between the point 310A at which the binder 110 is applied to the first ply 102 and the press rollers 312 may be about 12 inches to 14 inches.

At step 408, the first ply 102 may meet the second ply 104 at the press rollers 312, and the pressure applied by the press rollers 312, together with the tackiness of the binder 110, may cause the first ply 102 to fuse with the second ply 104. As noted, in embodiments, indicia may be printed on the upper surface 104U of the second ply 104 before the second ply 104 is fused with the first ply at the press rollers 312.

At step 410, the liner 100 (and specifically a sheet comprising a plurality of liners 100) may move downstream of the press rollers 312 along path C for post-processing, e.g., die-cutting, printing, etc.

Thus, as has been described, the liner 100 may be stronger that typical liners used in the label industry, may be adaptable to a particular application, and unlike other premium liners which may be stiff and bulky, may be thin and flexible. Importantly, the cost of manufacturing the liner 100, in embodiments, may be a fraction of the cost of manufacturing other premium liners.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A label, comprising:
 a face ply comprising a face ply upper side and a face ply lower side, said face ply upper side configured to be printable, said face ply lower side comprising an adhesive;
 a liner, said liner comprising an upper liner ply and a lower liner ply, said upper liner ply comprising plastic having a release liner disposed thereon, said lower liner ply comprising printable paper, said upper liner ply being fused to said lower liner ply with a binder, said liner comprising a perforated border inwardly adjacent an outer edge of said liner;
 wherein;
  said upper ply is secured to said printable face ply via adhesive located outwardly adjacent said perforated border;
  said upper liner ply is releasably secured to said face ply lower side;
  an upper surface of said lower liner ply is configured to be printable;
  a lower surface of said lower liner ply is configured to be printable.

2. The label of claim 1, wherein said binder comprises synthetic latex.

3. The label of claim 1, wherein said binder comprises a copolymerized emulsion.

4. The label of claim 3, wherein said copolymerized emulsion includes Styrene and Butadiene.

5. The label of claim 1, wherein said upper liner ply is transparent.

6. The label of claim 1, wherein each of said upper surface and said lower surface comprises printed indicia, and indicia printed on said upper surface is viewable through said upper liner ply.

7. The label of claim 1, wherein said upper liner ply includes release material.

8. A label, comprising:
 a face ply comprising a face ply upper side and a face ply lower side, said face ply upper side configured to be printable, said face ply lower side comprising an adhesive; and
 a liner, said liner comprising an upper liner ply and a lower liner ply, said upper liner ply comprising plastic, said lower liner ply comprising paper, said upper liner ply being fused to said lower liner ply via a bonding agent, said liner comprising a perforated border inwardly adjacent an outer edge of said liner;
 wherein;
  said upper ply is secured to said printable face ply via adhesive located outwardly adjacent said perforated border;
  said upper liner ply is releasably secured to said face ply lower side;
  an upper surface of said lower liner ply is configured to be printable with a first printable coating; and
  a lower surface of said lower liner ply is configured to be printable with a second printable coating.

9. The label of claim 8, wherein each of said upper surface and said lower surface comprises printed indicia, and indicia printed on said lower surface is visible through said upper liner ply.

10. The label of claim 8, wherein said first printable coating is a direct thermal printable coating.

11. A label, comprising:
 a printable face ply; and
 a liner, said liner comprising an upper ply and a lower ply fused together with a binding agent, said upper ply comprising transparent plastic, said lower ply comprising paper, said liner comprising a perforated border inwardly adjacent an outer edge of said liner;
 wherein:
  said upper ply is secured to said printable face ply via adhesive located outwardly adjacent said perforated border;
  an upper surface of said lower ply located inwardly adjacent said perforated border is configured to be printable with a first printable coating;
  a lower surface of said lower ply is configured to be printable with a second printable coating; and
  indicia printed on said lower ply is visible through said upper ply.

12. The label of claim 11, wherein said upper ply is releasably secured to said printable face ply.

13. The label of claim 11, wherein said upper ply is permanently secured to said lower ply.

14. The label of claim 11, wherein said paper is configured to be printed via a direct thermal printer.

15. The label of claim 11, wherein said paper is configured to be printed via a laser printer.

* * * * *